United States Patent
Schelhaas et al.

(10) Patent No.: US 6,827,875 B2
(45) Date of Patent: Dec. 7, 2004

(54) CYCLIC KETONES AS BLOCKING AGENTS

(75) Inventors: Michael Schelhaas, Köln (DE); Christoph Gürtler, Köln (DE)

(73) Assignee: Bayer Aktiengesellschaft, Leverkusen (DE)

( * ) Notice: Subject to any disclaimer, the term of this patent is extended or adjusted under 35 U.S.C. 154(b) by 245 days.

(21) Appl. No.: 10/185,512

(22) Filed: Jun. 28, 2002

(65) Prior Publication Data

US 2003/0026999 A1 Feb. 6, 2003

(30) Foreign Application Priority Data

Jul. 3, 2001 (DE) .......................................... 101 32 016

(51) Int. Cl.⁷ .............................................. C08G 18/80
(52) U.S. Cl. .................... 252/182.2; 560/25; 528/45; 428/423.1
(58) Field of Search .................. 252/182.2; 560/25; 528/45; 428/423.1

(56) References Cited

U.S. PATENT DOCUMENTS 5,071,937 A    12/1991   Potter et al. .................. 528/45
6,060,573 A    5/2000    Konig et al. .................. 528/45

OTHER PUBLICATIONS

Farbe & Lack, Oct. 1995, pp. 51–58, Einsatz einkomponentiger Einbrennurethanbeschichtungen Ein Uberblick uber systeme mit geringer thermovergilbung und niedriger Einbrenntemperatur by Dr. T. Engbert, Dr. E. Konig und Dr. E. Jurgens.

Progress in Organic Coatings, 36 (month unavailable) 1999, pp. 148–172, Blocked isocyanates III: Part A. Mechanisms and chemistry by D. A. Wicks and Z. W. Wicks, Jr.

Progress in Organic Coatings, 9 (month unavailable) 1981, pp. 3–28, New Developments in the Field of Blocked Isocyanates by Z. W. Wicks, Jr.

Progress in Organic Coatings, 3 (month unavailable) 1975, pp. 73–99, Blocked Isocyanates by Z. W. Wicks, Jr.

Primary Examiner—James J. Siedleck
Assistant Examiner—Melanie Bissett
(74) Attorney, Agent, or Firm—Joseph C. Gil; Gary F. Matz

(57) ABSTRACT

The present invention relates to new blocked polyisocyanates with which high-grade, emission-free coatings and lacquer coatings with reduced yellowing values can be obtained, to a method of producing them, and to the use thereof in one-component polyurethane systems, particularly as crosslinking agents in automobile primer surfacers.

11 Claims, No Drawings

CYCLIC KETONES AS BLOCKING AGENTS

FIELD OF THE INVENTION

The present invention relates to a blocked organic polyisocyanate, a method of producing it and one-component polyurethane systems containing it.

BACKGROUND OF THE INVENTION

Blocking of polyisocyanates to effect temporary protection of the isocyanate groups thereof is a procedure which has long been known, and is described, for example, in Houben Weyl, Methoden der organischen Chemie XIV/2, pages 61–70. Hardenable compositions which contain blocked polyisocyanates are used in polyurethane coating compositions, for example.

One-component (1K) polyurethane systems are widely used in the field of industrial stoving lacquers such as mass-production automobile coatings and coil coatings, and have very good film properties, such as resistance to chemicals, scratch-resistance and resistance to weathering. These lacquer films are hardened by thermal activation (by a stoving operation) of the blocked polyisocyanates with polyols, optionally in the presence of a suitable catalyst. A review of suitable blocking agents is given by Wicks et al. in Progress in Organic Coatings 1975, 3, pages 73–79, 1981, 9, pages 3–28 and 1999, 36, pages 148–172, for example.

In the field of automobile coating, the blocked polyisocyanates must be crosslinkable at maximum stoving temperatures of 140° C., and must only exhibit very slight yellowing, and preferably no yellowing, during the stoving operation. The stoving temperature is mainly controlled via the reactivity of the blocked polyisocyanate.

Most stoving systems, such as melamine-formaldehyde and urea-formaldehyde resins, for example, can release of volatile constituents during hardening, which increase the VOC value.

Moreover, a certain proportion of the blocking agent remains in the lacquer film which is formed and has a disadvantageous effect on the properties thereof. Due to the remaining blocking agent, properties such as the scratch-resistance and acid-resistance of one-component lacquer films are not comparable with two-component (2K) polyurethane lacquer coatings (e.g. T. Engbert, E. König, E. Jürgens, Farbe&Lack, Curt R. Vincentz Verlag, Hannover 10/1995). Furthermore, separation of the blocking agent and the escape thereof in gaseous form from the lacquer film can lead to bubble formation in the lacquer film. Subsequent incineration of the emitted blocking agent can sometimes be necessary.

Isocyanates, blocked with diethyl malonate, have mainly been used recently for particularly low stoving temperatures within the range from 90 to 120° C. (e.g. EP-A 0947531). In contrast to blocking procedures which employ heterocyclic N compounds, such as caprolactam or butanone oxime, for example, the blocking agent as a whole is not split off or separated here; rather, this blocking agent results in a transesterification reaction on the isocyanate which is blocked with diethyl malonate. Ethanol is separated during this transesterification. This method can be employed at relatively low stoving temperatures, since the second, adjacent ester function is an activated ester. The disadvantage of this method is that systems such as these are extremely susceptible to the effect of acids, because the labile ester bond can be rapidly cleaved. The possibilities for the use of these products are thereby restricted.

It is an object of the present invention to provide new blocked polyisocyanate systems which react without separation of the blocking agent, i.e. free from emissions, and which exhibit low crosslinking temperatures. It is another object that these blocked polyisocyanate systems should be stable on storage at ambient temperature, and that they should be suitable, particularly in combination with suitable polyol components, for the production of one-component stoving lacquers.

Surprisingly, it has now been found that acidic CH compounds which possess the basic structure of an activated cyclic ketone, particularly that of cyclopentanone-2-carboxymethyl ester, are particularly suitable for blocking polyisocyanates in order to obtain emission-free coatings with a reduced tendency to exhibit yellowing.

SUMMARY OF THE INVENTION

The present invention relates to a blocked organic polyisocyanate having at least two isocyanate groups, which are blocked with acidic CH cyclic ketones of formula (I),

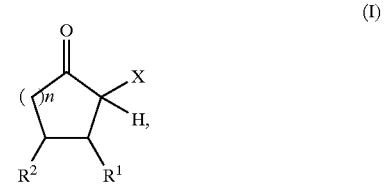

wherein

X is an electron-attracting group, $R^1$ and $R^2$, independently of each other, represent the radicals H, a $C_1$–$C_{20}$ (cyclo)alkyl, a $C_6$–$C_{24}$ aryl, a $C_1$–$C_{20}$ (cyclo)alkyl ester or amide, a $C_6$–$C_{24}$ aryl ester or amide, or mixed aliphatic/aromatic radicals having 1 to 24 carbon atoms, which can also form part of a 4 to 8-membered ring, n is an integer from 0 to 5, and which have a content of blocked isocyanate groups (calculated as NCO) of 20 to 0% by weight in total.

DETAILED DESCRIPTION OF THE INVENTION

A content of blocked isocyanate groups (calculated as NCO) ranging from 15.56 to 0% by weight is preferred. A content of blocked isocyanate groups (calculated as NCO) ranging from 14 to 0% by weight is more preferred. Partial blocking of the polyisocyanate can optionally be effected; the non-blocked isocyanate groups can then be used for further reactions. Typically, all the isocyanate groups are blocked.

The electron-attracting group X can include any substituent which results in the α-terminal hydrogen exhibiting an acidic CH character. Suitable substituents include ester groups, sulphoxide groups, sulphone groups, nitro groups, phosphonate groups, nitrile groups, isonitrile groups or carbonyl groups. Nitrile and ester groups are preferred, and methyl carboxylate and ethyl carboxylate groups are more preferred.

Suitable compounds of formula (I) can optionally contain hetero atoms such as oxygen, sulphur or nitrogen atoms, in the ring.

The activated cyclic ketone of formula (I) preferably has a ring size of 5(n=1) or 6(n=2).

Preferred compounds of formula (I) include cyclopentanone-2-carboxymethyl ester and -carboxyethyl ester, cyclopentanone-2-carboxylic acid nitriles, cyclohexanone-2-carboxymethyl ester and -carboxyethyl ester, or cyclopentanone-2-carbonylmethyl. Cyclopentanone-2-carboxymethyl ester and -carboxyethyl ester, as well as cyclohexanone-2-carboxymethyl ester and -carboxyethyl ester, are more preferred. The cyclopentanone systems can readily be obtained industrially by the Dieckmann condensation of dimethyl adipate or of diethyl adipate. Cyclohexanone-2-carboxymethyl ester can by be obtained by the hydrogenation of methyl salicylate.

The polyisocyanate to be blocked can be any organic polyisocyanate which is suitable for the crosslinking with compounds having active hydrogen. Examples include aliphatic polyisocyanates, cycloaliphatic polyisocyanates, aromatic and heterocyclic polyisocyanates containing at least two isocyanate groups and mixtures thereof. Examples of aliphatic isocyanates include di- or triisocyanates, such as butane diisocyanate (BDI), pentane diisocyanate, hexane diisocyanate (HDI), 4-isocyanatomethyl-1,8-octane diisocyanate (triisocyanatononane, TIN), or cyclic systems such as 4,4'-methylene-bis(cyclohexyl isocyanate) (Desmodur W, trade product Bayer AG, Leverkusen), 3,5,5-trimethyl-1-isocyanato-3-isocyanatomethyl-cyclohexane (IPDI), as well as ω,ω'-diisocyanato-1,3-dimethylcyclohexane ($H_6XDI$). Examples of aromatic polyisocyanates include 1,5-naphthalene diisocyanate, diisocyanato-diphenylmethane (MDI) or crude MDI, diisocyanatomethyl-benzene (TDI), particularly the 2,4- and the 2,6-isomers thereof and industrial mixtures of the two isomers thereof, as well as 1,3-bis(isocyanato-methyl)benzene (XDI). Polyisocyanates which are also very suitable are those which can be obtained by the reaction of di- or triisocyanates with themselves via their isocyanate groups, such as uretdiones or carbodiimide compounds, or such as isocyanurates or iminooxadiazinediones which are formed by the reaction of three isocyanate groups. The polyisocyanates can also contain monomeric di- and/or triisocyanates and/or oligomeric polyisocyanates comprising biuret, allophanate and acylurea structural elements, triisocyanates which have a low monomer content or partially modified monomeric di- or triisocyanates, as well as any mixtures of the aforementioned polyisocyanates.

Polyisocyanate prepolymers which on average contain more than one isocyanate group per molecule are also very suitable. These are obtained by the preliminary reaction of a molar excess of one of the aforementioned polyisocyanates, for example, with an organic material which contains at least two active hydrogen atoms per molecule, e.g. in the form of hydroxy groups.

The preferred polyisocyanates are those which contain a uretdione, isocyanurate, iminooxadiazinedione, acylurea, biuret or allophanate structure, e.g. those which are based on butane diisocyanate (BDI), pentane diisocyanate, hexane diisocyanate (HDI), 4-isocyanatomethyl-1,8-octane diisocyanate (triisocyanatononane, TIN) or on cyclic systems such as 4,4'-methylene-bis(cyclohexyl isocyanate), 3,5,5-trimethyl-1-isocyanato-3-isocyanatomethylcyclohexane (IPDI), as well as ω,ω'-diisocyanato-1,3-dimethylcyclohexane ($H_6XDI$). Examples of aromatic polyisocyanates include 1,5-naphthalene diisocyanate, diisocyanato-diphenylmethane (MDI) or crude MDI, diisocyanatomethylbenzene (TDI), particularly the 2,4-and 2,6-isomers thereof and industrial mixtures of both isomers thereof, as well as 1,3-bis(isocyanato-methyl)benzene (XDI).

Polyisocyanates which are more preferred are those based on hexane diisocyanate (HDI), on 4,41-methylene-bis (cyclohexyl isocyanate) or on 3,5,5-trimethyl-1-isocyanato-3-isocyanatomethylcyclohexane (IPDI).

The present invention further relates to a method of producing the blocked organic polyisocyanates by reacting a polyisocyanate with acidic CH cyclic ketones of formula (I),

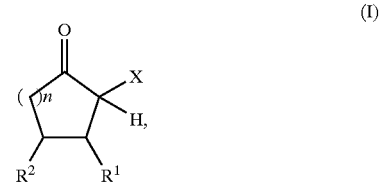

(I)

wherein
X is an electron-attracting group,
$R^1$ and $R^2$, independently of each other, represent the radicals H, a $C_1$–$C_{20}$ (cyclo)alkyl, $C_6$–$C_{24}$ aryl, a $C_1$–$C_{20}$ (cyclo)alkyl ester or amide, a $C_6$–$C_{24}$ aryl ester or amide, or mixed aliphatic/aromatic radicals comprising 1 to 24 carbon atoms, which can also form part of a 4 to 8-membered ring, and
n is an integer from 0 to 5,
in the presence of a catalyst, wherein 0.8 to 1.2 mol of the cyclic ketone of formula (I) are used per isocyanate group equivalent of the polyisocyanate to be blocked.

One isocyanate group equivalent of the polyisocyanate to be blocked is preferably reacted with 1 equivalent of the blocking agent.

Suitable catalysts include alkali metal and alkaline earth metal bases, such as powdered sodium carbonate (soda). Depending on the cyclic ketone used, trisodium phosphate or Dabco (1,4-diazabicyclo[2.2.2]octane) can also be used. Carbonates of metals of subgroup 11 are also suitable. Sodium carbonate or potassium carbonate is preferably used. Alternatively, the reaction of the cyclic ketone with the isocyanate can also be conducted in the presence of zinc salts as catalysts. Reaction with zinc 2-ethylhexanoate is particularly preferred. The amount of catalyst added is usually between 0.05 to 10% by weight, preferably 0.1 to 3% by weight, and 0.2 to 1% by weight of catalyst is more preferred.

The reaction can be conducted at room temperature or at higher temperatures up to 140° C. A temperature range from 40 to 90° C. is preferred.

The blocking reaction can be performed without solvents or in the presence of suitable solvents. Suitable solvents include customary lacquer solvents such as butyl acetate, methoxypropyl acetate or the solvent naphtha supplied by Exxon-Chemie (Esso Deutschland GmbH, Hamburg) as well as mixtures of the aforementioned solvents. It is preferred that the blocking reaction is effected in the aforementioned solvents, wherein the solids content should be adjusted so that it ranges between 10 and 90%.

In addition to the cyclic ketones of formula (I) mixtures with other blocking agents can also be used according to the invention in order to achieve the lacquer properties which are required in each case, wherein the proportion of compounds of formula (I) is preferably at least 30% by weight, more preferably 50% by weight, and most preferably 100% by weight.

Finally, the present invention also relates to a method of producing 1-K PUR stoving lacquers, wherein the organic blocked polyisocyanates according to the invention are used as a crosslinking component for organic polyhydroxyl compounds.

The blocked polyisocyanates according to the invention are distinguished in that, in combination with a suitable organic polyhydroxyl compound and in the presence of suitable catalysts, they harden at stoving times of 15 to 30 minutes and at temperatures from 110 to 140° C., preferably from 120 to 140° C. The stoving times depend in particular on the amount of catalyst used. Stoving is preferably conducted for a period of 30 minutes at a temperature of 120–140° C.

Examples of suitable catalysts for crosslinking include DBTL (dibutyltin dilaurate), zinc-2-ethylhexanoate and bismuth 2-ethylhexanoate. The preferred catalysts are zinc 2-ethylhexanoate and bismuth-2-ethylhexanoate.

Suitable polyhydroxyl compounds for this purpose of use, as well as further details with regard to the production and use of stoving lacquers of this type, can be taken from the literature. The most preferred field of application for the products according to the invention is the use thereof as crosslinking agents in automobile primer surfacers.

High-grade, emission-free coatings or lacquer coatings with reduced yellowing values can be obtained by using the blocked polyisocyanates according to the invention.

In addition, the blocked polyisocyanates according to the invention can be hardened with di- or polyamines. This reaction is preferably conducted at room temperature. It can be used for the production of lacquer coatings or workpieces.

EXAMPLES

Polyisocyanate I was an HDI polyisocyanate with an isocyanurate structure, an NCO content of 21.8%, and a viscosity of 3200 mPa.s (trade product Desmodur N3300, Bayer AG, Leverkusen).

The cyclopentanone-2-carboxymethyl ester and cyclohexanone-2-carboxymethyl ester which were used as blocking agents were ordered from the Fluka company and were used without further purification.

Preparation of Polyisocyanates Blocked with Acidic α Cyclic Ketones

Example 1

A solution of 58.5 g (0.3 equivalent) Polyisocyanate I in 81 ml butyl acetate was added, slowly and with intensive stirring, to a solution of cyclopentanone-2-carboxymethyl ester (42.7 g, 0.3 equivalent) dissolved in 20 ml butyl acetate. 1.02 g zinc 2-ethylhexanoate was added as a catalyst. The batch was heated to a temperature of 50° C., (for about 8 hours) until a determination of the NCO value gave a value of about 0.2%. The theoretical blocked NCO content was 6.2%.

Example 2

A solution of 42.6 g (0.25 equivalent) Polyisocyanate I in 71.4 ml butyl acetate was added, slowly and with intensive stirring, to a solution of cyclohexanone-2-carboxymethyl ester (42.6 g, 0.25 equivalent) dissolved in 20 ml butyl acetate. 0.9 g zinc 2-ethylhexanoate was added as a catalyst. The batch was heated to a temperature of 80° C., until a determination of the NCO value gave a value of about 0.3% (after about 6 hours). The theoretical blocked NCO content was 5.75%.

Production of Polyurethane Lacquers According to the Invention

The polyisocyanates listed in the following Table were processed in stoichiometric amounts with polyols to form clear lacquers according to the formulations listed below, and with the addition of the customary additives Baysilone® OL 17 (trade product of Bayer AG, Leverkusen (flow enhancer), 0.1% solid with respect to solid binder vehicle) and Modaflow® (trade product of Monsanto Corp., Solutia Inc., USA; 0.01% solid with respect to solid binder vehicle).

Example 3

Lacquer Formulation A

Polyisocyanate I, blocked with cyclopentanone-2-carboxymethyl ester (supplied as an approximately 50% solution in butyl acetate; blocked NCO content: 6.2%) (MPA=methoxy propylacetate, SN=solvent naphtha):

|  | % by weight |
|---|---|
| Desmophen ® A 870 (polyacrylate polyole, trade product of Bayer AG, Leverkusen), 70% in BA | 35.94 |
| Desmodur ® N3300. blocked with cyclopentanone 2-carboxymethyl ester (50% in BA from Example 1) | 34.82 |
| Baysilone ® OL 17, 10% in xylene | 0.48 |
| Modaflow ®, 1% in xylene | 0.48 |
| Tinuvin ® 292 (trade product of Ciba AG, Basle, Switzerland), 10% in xylene | 4.78 |
| Tinuvin ® 1130 (trade product of Ciba AG, Basle, Switzerland), 10% in xylene | 9.56 |
| Bismuth 2-ethylhexanoate, 10% in MPA | 7.17 |
| MPA/SN 100 (1:1) | 6.77 |
| Total | 100 | ratio of blocked NCO/OH: 1.0,
solids content: about 45%,
catalyst content: 1.5% (solid with respect to solid binder vehicle).

ratio of blocked NCO/OH: 1.0, solids content: about 4.5%, catalyst content: 1.5% (solid with respect to solid binder vehicle).

The system exhibited only very slight yellowing. This system could also be used successfully when the NCO/OH ratio was 1:1.5.

Lacquer Formulation B (Comparison)

|  | % by weight |
|---|---|
| Desmophen ® A 870, 70% in BA | 37.15 |
| mixed trimer of hexamethylene diisocyanate and IPDI, blocked with diisopropylamine (50% in BA) | 33.88 |
| Baysilone ® OL 17, 10% in xylene | 0.48 |
| Modaflow ®, 1% in xylene | 0.48 |
| Tinuvin ® 292 (Ciba AG, Basle, Switzerland), 10% in xylene | 4.80 |
| Tinuvin ® 1130 (Ciba AG, Basle, Switzerland), 10% in xylene | 9.61 |
| DBTL, 10% in xylene | 4.80 |
| MPA/SN 100 (1:1) | 8.80 |
| Total | 100 |

Stoving conditions: 30 minutes at 140° C.

In solvent-containing lacquers, even at relatively low stoving temperatures, this system exhibited a clear yellow coloration. The delta b value from 140 to 160° C. (30 minutes) was 3.2, and was thus about four times higher that that of a system which exhibited only slight yellowing (e.g. dimethylpyrazole), when applied over a base lacquer which contained a white solvent in each case.

Measurement of yellowing due to overstoving: after stoving the lacquers for 30 minutes at 140° C., a first colour measurement was made using what is termed the CIELAB method. The higher the positive b value which is determined

What is claimed is:

1. A blocked organic polyisocyanate having at least two isocyanate groups, which are blocked with an acidic CH cyclic ketone formula (I),

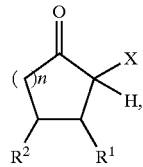

wherein
X is an electron-attracting group,
R$^1$ and R$^2$, independently of each other, represent the radicals H, a C$_1$–C$_{20}$ (cyclo)alkyl, a C$_6$–C$_{24}$ aryl, a C$_1$–C$_{20}$ (cyclo)alkyl ester or amide, a C$_6$–C$_{24}$ aryl ester or amide, or a mixed aliphatic/aromatic radical having 1 to 24 carbon atoms, which can also form part of a 4 to 8-membered ring,
n is an integer from 0 to 5,
and which have a content of blocked isocyanate groups (calculated as NCO) present in an amount of up to 20% by weight in total.

2. The blocked organic polyisocyanate of claim 1 wherein the electron-attracting group X is selected from ester, sulphoxide, sulphone, nitro, phosphonate, nitrile, isonitrile or carbonyl groups.

3. The blocked organic polyisocyanate of claim 1 wherein the acidic CH cyclic ketone of formula (I) comprises cyclopentanone-2-carboxymethyl ester, cyclopentanone-2-carboxyethyl ester, cyclo-pentanone-2-carboxylic acid nitrite, cyclohexanone-2-carboxymethyl ester, cyclohexanone-2-carboxyethyl ester, or cyclopentanone-2-carbonylmethyl.

4. The blocked organic polyisocyanate of claim 1 wherein the acidic CH cyclic ketone of formula (I) comprises cyclopentanone-2-carboxymethyl ester, cyclopentanone-2-carboxyethyl ester, cyclo-hexanone-2-carboxy-methyl ester, or cyclohexanone-2-carboxyethyl ester.

5. A method of producing an organic polyisocyanate comprising reacting a polyisocyanate with an acidic CH cyclic ketones of formula (I),

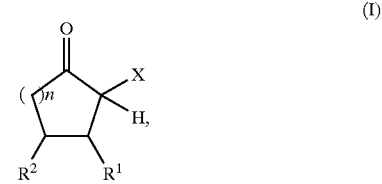

wherein
X is an electron-attracting group,
R$^1$ and R$^2$, independently of each other, represent the radicals H, a C$_1$–C$_{20}$ (cyclo)alkyl, a C$_6$–C$_{24}$ aryl, a C$_1$–C$_{20}$ (cyclo)alkyl ester or amide, a C$_6$–C$_{24}$ aryl ester or amide, or a mixed aliphatic/aromatic radicals comprising 1 to 24 carbon atoms, which can also form part of a 4 to 8-membered ring, and
n is an integer from 0 to 5,
in the presence of a catalyst, wherein 0.8 to 1.2 mol of the cyclic ketone of formula (I) are used per isocyanate group equivalent of the polyisocyanate.

6. The method of claim 5, wherein the organic polyisocyanate comprises a uretdione, isocyanurate, iminooxadiazinedione, acylurea, biuret or allophanate structure.

7. The method of claim 5, wherein the catalyst comprises an alkali metal, an alkaline earth metal base or a zinc salt.

8. A one-component polyurethane stoving lacquer comprising an organic polyisocyanate of claim 1 as a crosslinking component and an organic polyhydroxyl compound.

9. A method of coating a substrate comprising hardening the blocked organic polyisocyanate of claim 1 and an organic polyhydroxyl compounds at stoving times from 15 to 30 minutes and at temperatures from 110 to 140° C.

10. A coated substrate prepared with one-component polyurethane stoving of claim 8.

11. The substrate of claim 10, wherein the substrate is a part in the automotive industry.

* * * * *